May 27, 1952     C. A. THOMAS     2,598,464
DYNAMOELECTRIC MACHINE
Filed May 10, 1951
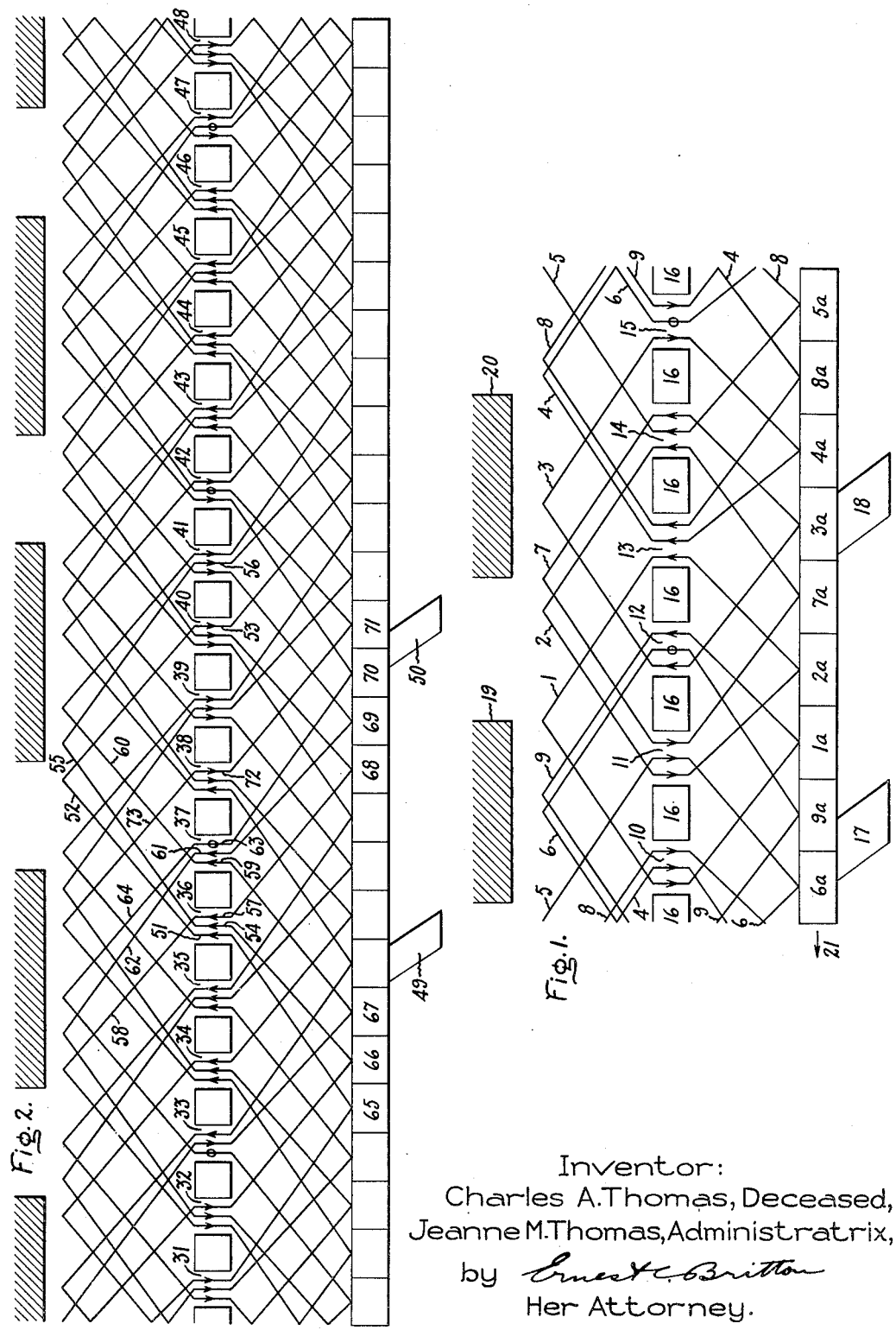
Inventor:
Charles A. Thomas, Deceased,
Jeanne M. Thomas, Administratrix,
by Ernest C. Britton
Her Attorney.

Patented May 27, 1952

2,598,464

UNITED STATES PATENT OFFICE 2,598,464

DYNAMOELECTRIC MACHINE

Charles A. Thomas, deceased, late of Fort Wayne, Ind., by Jeanne M. Thomas, administratrix, Fort Wayne, Ind., assignor to General Electric Company, a corporation of New York Application May 10, 1951, Serial No. 225,489

6 Claims. (Cl. 171—206)

The invention relates to commutator type dynamoelectric machines and while the invention is applicable to any dynamoelectric machine of the commutator type in which it is important or desirable to limit the number of coils which are undergoing simultaneous commutation, it is especially applicable to such machines having a small number of winding slots in the armature.

In the design of commutator dynamoelectric machines having a small number of winding slots in the rotor, a problem arises with respect to the commutating of the coils. It is desirable to have an even number of winding slots in the rotor because this results in the total rotor area under each pole being the same at any given instant so that the distribution of flux is symmetrical under opposite poles. Also an even number of rotor slots results in equal voltage on either side of the brushes during commutation. If the machine is one having an even number of slots, however, it will also have an even number of commutator bars when it is wound in the customary manner. When there is an even number of commutator bars, each of the brushes will be centered over the insulation between two adjacent commutator bars at the same instant and each brush will also begin and end the commutation of a coil simultaneously. This results in an extreme amount of commutator ripple and variation in the torque of the motor.

If an odd number of slots are used, the voltage on each side of the brushes is unbalanced. Then, however, there is an odd number of commutator bars so that the brushes do not begin and end the commutation of two coils simultaneously. Therefore, the ideal situation is to provide a rotor with an even number of winding slots and an odd number of commutator bars. The practice of this invention will permit such an arrangement.

An object of this invention is to improve the commutating condition of commutator type dynamoelectric machines by reducing the number of coils undergoing simultaneous commutation.

Another object of this invention is to provide a commutator type dynamoelectric machine provided with a rotor having an even number of coil slots and an odd number of commutator bars.

Further objects and advantages of this invention will become apparent and the invention will be better understood from the following description which refers to the accompanying drawing, and the features of novelty which characterize the invention will be set forth with particularity in the accompanying claims annexed to and forming part of this specification.

In accordance with this invention, an integral number of full coils per slot are lap wound on the armature in the usual manner. Then an additional number of coils equal to one-half the number of coil slots is wound with one coil side in each slot. The additional coils are connected to commutator bars which are equally spaced about the commutator. Equally spaced brushes bear on the commutator so that when the trailing edge on one brush is at the center of a commutator bar the trailing edge of the other brush is at the trailing edge of another commutator bar. This invention can also be utilized in certain multipolar machines employing a wave winding without the need of using a dead coil that would otherwise be necessary.

In the drawing, Fig. 1 is a schematic illustration of the invention as applied to a two-pole lap wound machine having six rotor slots and nine commutator segments and one and one-half full coils per slot; and Fig. 2 is a schematic illustration of the invention as applied to a 4-pole wave wound machine having 18 slots and 27 commutator segments and one and one-half full coils per slot.

Referring to Fig. 1, the commutator is made up of commutator segments 1a to 9a inclusive, and is represented as laid out flat. A series of coils numbered 1 to 9 inclusive, are lap wound and connected to the commutator segments as shown. 16 represents the armature teeth and 10 to 15 inclusive represent the coil slots, each of which contain three coil sides. The two poles of the machine are represented at 19 and 20. 17 and 18 represent the pair of brushes for the machine. These brushes preferably contact the commutator for a peripheral length of slightly less than one commutator bar.

With specific reference to coil 1, it will be noted that this coil is connected at its ends to commutator bars 1a and 2a and is wound in slots 10 and 13. It will likewise be noted that coil 2 is connected to commutator bars 2a and 7a and is wound in slots 11 and 14. Similarly, coils 3 to 6 inclusive, are lap wound in the usual manner. However, coil 7 is wound in the same slots as coil 2. It will be further observed that coil 8 is wound in the same slots as coil 4 and coil 9 is wound in the same slots as coil 6. Also it will be noted that the ends of these coils 7, 8, and 9 are connected to commutator bars equally spaced about the commutator. Thus it is apparent that a characteristic of this invention is that alternate slots contain one leading coil side more than the number of trailing coil sides therein. The remaining slots contain one more trailing coil side than leading coil sides.

Assuming a direction of movement of the commutator as indicated at 21, it will be observed that coil 6, having its ends connected to commutator bars 6a and 9a is undergoing commutation through brush 17. It will be further observed that brush 18 contacts only commutator segment 3a and hence is not causing the commutation of any coils. As the commutator moves in direction 21 the distance of one-half the width of a commutator bar, brush 17 assumes a position in which it contacts only commutator bar 9, whereas brush 18 now connects commutator bars 3a to 4a to cause a commutation of coil 3. It will be observed that there is an overlap in the commutation periods of coils 6 and 3. In the ordinary machine having an even number of winding slots and an even number of commutator bars on the armature, each of the brushes short a pair of commutator bars resulting in the commutation of two coils during exactly the same period and the two brushes will start and stop the commutation of the two coils simultaneously. This results in a great variation in torque and a high commutator ripple which is overcome by this invention. Further, with the arrangement of this invention all coils undergoing commutation are not under the poles and hence are not cutting lines of flux.

While Fig. 1 illustrates a winding arrangement having only one full coil per slot, it is apparent that this invention may be used where there are two or more full coils per slot. All that is necessary is to wind a number of coils equal to one-half the number of slots in addition to the desired number of full coils per slot and connect these added coils to equally spaced commutator bars. For example, in an armature having six slots, twelve full coils per slot are wound in the usual manner and then three additional coils are added wound with one coil side in each slot. These additional three coils are connected to equally spaced commutator bars.

By the practice of this invention the number of coil slots in the rotor may be reduced to a minimum and yet result in a motor having good commutation characteristics. By using a small number of slots, a less percentage of insulation is needed resulting in more space being available for the winding or for iron in the armature teeth. The net result is a reduction of the diameter of the armature or an increase in the power available from a given diameter armature.

Fig. 2 represents a four-pole motor illustrating the use of this invention in a machine having 18 winding slots and 27 commutator bars and wound with a wave type winding. In Fig. 2, the winding slots of the armature are represented at 31 and 48 inclusive. Brushes 49 and 50 are displaced 180 electrical degrees and are preferably of a width slightly less than the peripheral length of a commutator segment.

It will again be observed that alternate slots contain two leading coil sides and one trailing coil side. The remaining slots contain two trailing coil sides and one leading coil side. Referring to Fig. 2, coils 52 and 55 have leading coil sides 51 and 54, respectively, and trailing coil sides 53 and 56, respectively. It will be noted that leading coil sides 51 and 54 are both positioned in slot 36 while trailing coil side 53 lies in winding slot 40 and trailing coil side 56 lies in slot 41. It will also be noted that trailing coil side 57 of coil 58 lies in slot 36 whereby slot 36 contains two leading coil sides and one trailing coil side. Slot 37 contains a single leading coil side 59 of coil 60 and two trailing coil sides 61 and 63 of coils 62 and 64, respectively. It will be further noted that all even numbered slots contain two leading coil sides while all odd numbered slots contain two trailing coil sides. This results in a mechanically and electrically balanced winding.

The commutator bars are connected in sequence to the coils so that the coils are connected in order. Commutator bars 65, 66 and 67 are connected to the leading ends of coils 52, 55 and 60, respectively. Also commutator bars 68, 69, 70, and 71 are connected to the trailing ends of coils 58, 62, 64 and 73, respectively. Thus it will be seen that the coils are commutated in the usual sequential manner.

By using this arrangement it is also possible to wind an armature with a wave winding having more than three coil sides per slot. For example, an eighteen slot armature may be wound with a wave winding of two and one-half full coils per slot. This may be accomplished by placing three leading coil sides and two trailing coil sides in each of alternate slots and three trailing coil sides and two leading coil sides in the remaining slots. It is apparent that by using this winding scheme a wave winding may be used with armatures having a properly selected number of winding slots. The number of winding slots must be such that when multiplied by one and one-half the product will be an odd number.

While there has been illustrated and described herein particular embodiments of the invention, various modifications thereof will occur to those skilled in the art. It is to be understood therefore, that the invention is not to be limited to the particular embodiment shown and it is intended in the appended claims to cover all modifications which do not depart from the spirit and scope of the invention.

What is claimed as new and desired to be secured by Letters Patent of the United States is:

1. An armature for a dynamoelectric machine of the commutator type having an even number of winding slots and an odd number of commutator bars, a winding for said armature, said winding having an integral number of full coils per slot plus an additional number of full coils equal to one-half the number of slots, said winding being wound with an odd number of coil sides per slot.

2. An armature for a dynamoelectric machine of the commutator type having an even number of winding slots, a winding for said armature, said winding having an integral number of full coils per slot plus an additional number of full coils equal to one-half the number of slots, said first full coils being wound in said slots in the normal manner, and said added coils being wound with one coil side in each slot, and a commutator having a number of commutator bars equal to the number of full coils in the winding, said added coils being connected to equally spaced commutator bars.

3. An armature-commutator assembly for a dynamoelectric machine of the commutator type comprising an armature core having an even number of winding slots, and an odd number of commutator bars for the connection of the winding coils, a winding for said armature, said winding having an integral number of full coils per slot, and in addition thereto, a number of full coils equal to one-half the number of slots, said winding being lap wound in said slots whereby each slot contains an odd number of coil sides, said additional coils being connected to equally spaced commutator bars.

4. In a dynamoelectric machine of the commutator type having a commutator with an odd number of current collecting bars, a pair of brushes spaced substantially 180 electrical degrees apart, an armature core having an even number of winding slots, a winding comprising a plurality of full coils wound with an odd number of coil sides in each of said slots, the number of full coils in said winding having an integral number of full coils per slot, and in addition thereto, a number of full coils equal to one-half the number of slots, said additional coils being connected to equally spaced commutator bars.

5. In a dynamoelectric machine of the commutator type, an armature-commutator assembly comprising an armature core having an even number of slots and a commutator having an odd number of bars, a winding for said armature, said winding having at least one full coil per slot wound in a normal manner and, in addition thereto, a number of full coils equal to one-half the number of slots wound with one coil side in each slot.

6. In a dynamoelectric machine of a commutator type, an armature-commutator assembly comprising an armature core having an even number of coil slots, a winding for said armature, said winding having at least one full coil per slot, and in addition thereto the number of full coils equal to one-half the number of slots, each of said coils having leading and trailing coil sides, said armature being wound so that alternate slots contain one more leading coil side than the number of trailing coil sides contained therein and the remaining slots containing one more trailing coil side than the number of leading coil sides contained therein.

JEANNE M. THOMAS,
*Administratrix of the Estate of Charles A. Thomas, Deceased.*

No references cited.